PREPARATION OF PHENOXYPHENOLS

Charles E. Villars, East Lansing, Mich., assignor to The Dow Chemical Company, Midland, Mich., a corporation of Delaware
No Drawing. Filed Apr. 7, 1958, Ser. No. 726,599
7 Claims. (Cl. 260—613)

This invention concerns a method for making phenoxyphenols by reacting an ar-halophenol of the group consisting of the chloro- and bromophenols including alkyl- and aryl-substituted ar-halophenols with potassium phenate in the presence of free phenol, a copper catalyst and potassium hydroxide.

Various ways for making certain phenoxyphenols are known to the art. For example, dihydric phenols have been reacted with diazonium chloride and decomposed. This method gives poor yields and troublesome by-products. Also, dihydroxyphenols are relatively expensive. A second method involves a condensation reaction between an ortho- or meta-bromoanisole with an alkali metal phenate and demethylation of the resulting product in the presence of an aluminum trichloride or hydrogen iodide catalyst. This method involves a two-step process. Also ortho- and meta-bromoanisoles are not readily available. A third method involves the electrolytic oxidation of phenol to give phenoxyphenol as one of many products. A fourth method involves diazotizing aminophenyl phenyl ether and decomposing the diazonium salt to give phenoxyphenol. In this reaction the starting material is not readily available, and yields are poor. A fifth method involves the hydrolysis of bromo- or chlorophenyl phenyl ether under pressure to give phenoxyphenol. This reaction requires pressure equipment. A sixth method involves the reaction between monochlorobenzene and ortho-hydroxypotassium phenate to give o-phenoxyphenol. This reaction proceeds with difficulty, since chlorobenzene is relatively non-reactive. Pressure equipment is required to reach temperatures high enough to cause reaction. A seventh method involves the reaction between phenylmagnesium bromide with hydrogen peroxide to give o-phenoxyphenol. An eighth method involves the reduction of anthraquinone with sodium and liquid ammonia to give o-phenoxyphenol. This reaction is limited to the ortho-isomer and requires the use of liquid ammonia, which is troublesome on a large scale. Thus, prior are procedures are seen to give low yields, products contaminated with by-products, involve relatively expensive reactants or are limited in scope.

It has now been discovered that isomeric ar- bromo- and chlorophenols including alkyl- and aryl-substituted bromo- and chlorophenols can be reacted equimolecularly with potassium phenate in the presence of excess phenol and a catalytic amount of a copper or mercury-promoted copper catalyst at a temperature between about 150° C. and about 200° C., preferably between 170° C. and reflux temperature. The higher the proportion of excess phenol present, the lower the proportion of undesired by-products, since excess phenol reduces the probability of reaction of the chlorophenol with itself. At the same time, excess phenol acts as a solvent. Advantageously at least two molar proportions of phenol per mole of halophenol is used. The upper limit is purely economic.

A substantial excess of potassium phenate is used, i.e., from 1.5 to 5 moles per mole of ar-halophenol, preferably from 1.5 to 3 moles of phenate per mole of ar-halophenol. The potassium phenate can be introduced as such or can be formed in situ, in which case water of reaction is removed, advantageously by azeotropic distillation with benzene or the like, prior to reaction with the halophenol. The reaction is advantageously carried out at atmospheric or substantially atmospheric pressure. From about 1/30 to 1/3 mole of copper catalyst per mole of ar-halophenol is advantageously used. Larger amounts than 1/3 mole of copper powder per mole of halophenol are uneconomic. The copper catalyst is advantageously in finely divided or powder form, and preferably promoted with mercury in amounts ranging between traces and 0.01 mole per mole of copper catalyst.

Suitable ar-halophenol reactants include o-, m- and p-chlorophenol, 3,4-dichlorophenol, 2,4-dichlorophenol, 2,4,5-trichlorophenol, isomeric alkyl chlorophenols, such as p-chloro-o-cresol, isomeric aryl chlorophenols, such as 2-chloro-4-phenylphenol, etc.

In practice, a charge containing potassium phenate, phenol and copper powder or mercury-promoted copper powder catalyst is heated to about 170° C. The ar-halophenol is then gradually added, approximately as fast as it reacts so as to avoid a substantial concentration of it which would permit self-condensation. After all the halophenol has been added, the reaction temperature is raised to at least 180° C. or up to reflux temperature for the mixture. Upon completion of the reaction, which can be determined by analysis for halide ion, the reaction mixture is cooled and poured into water. The resulting mixture is then acidified, advantageously with hydrochloric or sulfuric acid. The resulting crude product is separated, washed with water and distilled under vacuum.

Products are identified by their physical properties, their elemental analyses and their infrared absorption spectra.

The following examples show ways in which the invention has been practiced.

*Example 1.—Preparation of o-Phenoxyphenol:* A charge of 1275 g. (13.6 mole) phenol, 10 g. copper powder and 0.25 g. mercury was placed in a 5-liter reaction vessel equipped with a stirrer, thermometer, and azeotroping head. Benzene (250 ml.) was added as an azeotroping agent. The charge was kept at 100°–150° C. while 320 g. (5.0 mole) 86 percent KOH was added stepwise and the water was azeotroped off as formed. The charge was then heated to 170° C. and 385 g. (3.0 mole) o-chlorophenol was added over a period of 4 hours. After the temperature was increased to 185° C. for 30 minutes, the mixture was cooled and quenched on ice. The resulting mixture was acidified with concentrated HCl, and the oil which separated was filtered, washed with water and distilled. The o-phenoxyphenol product boiled at 115° C. at 1.5 mm. Hg. Yield, 325 g. (62.5 percent, chlorophenol basis) M.P., 104°–106° C.

*Example 2.—Preparation of 4-Chloro-2-Phenoxyphenol and 2,4-Diphenoxyphenol:* A charge of 1500 g. (16.0 mole) phenol, 10 g. copper powder and 1/4 g. mercury was placed in a 5-liter reaction vessel equipped with a stirrer, thermometer and azeotroping head. Benzene (400 ml.) was added as an azeotroping agent. The charge was kept at 100°–150° C. while 470 g. (7.0 mole) 86 percent KOH was added stepwise and the water was azeotroped off as formed. At a temperature of 173°–182° C., 489 g. (3.0 mole) 2,4-dichlorophenol was added over a period of 4½ hours. The mixture was poured into cold water, acidified with concentrated HCl, and the oil which separated was filtered. Distillation at 2 mm. Hg gave 196 g. (29 percent) of 4-chloro-2-phenoxyphenol, B.P. 126–131° C./2 mm. Hg and 202 g. (25 percent) of 2,4-diphenoxyphenol, B.P. 184°–187° C./1 mm. Hg.

The following table summarizes runs performed similarly to Example 2 with the indicated chlorophenols.

Table
PHENOXYPHENOLS

| Reactant (3 moles) | Moles Phenol | Moles KOH | Time, Hrs. | Product | B.P./mm., °C. | Percent Yield Chlorophenol Basis |
|---|---|---|---|---|---|---|
| 3-Chlorophenol | 10.0 | 5.0 | 3 | 3-phenoxyphenol | 150–3/3 | 43 |
| 4-Chloro-2-Methylphenol | 10.0 | 5.0 | 9 | 4-phenoxy-2-methylphenol | 153–6/3 | 28 |
| 2,4,5-Trichlorophenol | 16.0 | 7.0 | 3 | {x-dichloro-x-phenoxyphenol / x-chloro-x-phenoxyphenol} | [1] 65–83 / 200–220/1 | 28 / 15 |
| 2-Chloro-4-Phenylphenol | 13.0 | 5.0 | 8 | 2-phenoxy-4-phenylphenol | [1] 167–8 | 56 |

[1] M.P.

What is claimed is:

1. A method for making a phenoxyphenol which includes the steps of adding an ar-halophenol selected from the group consisting of the ar-chloro- and ar-bromo- species to a mixture consisting of potassium phenate, phenol, and a copper catalyst selected from the group consisting of metallic copper and mercury-promoted metallic copper at a temperature ranging between 170° C. and the reflux temperature of the mixture, the potassium phenate proportion ranging between 1.5 and 5 moles per mole of said halophenol, the amount of phenol being at least twice molar that of the halophenol, and the copper catalyst ranging from about 1/30 to 1/3 mole per mole of the halophenol, and recovering the phenoxyphenol product of the reaction.

2. The method of claim 1, wherein the halophenol is ar-chlorophenol.

3. The method of claim 1, wherein the halophenol is 2,4-dichlorophenol.

4. The method of claim 1, wherein the halophenol is 4-chloro-2-methylphenol.

5. The method of claim 1, wherein the halophenol is 2,4,5-trichlorophenol.

6. The method of claim 1, wherein the halophenol is 2-chloro-4-phenylphenol.

7. The method of claim 1, wherein the reacted mixture is cooled, poured into water, acidified, and the resulting product is separated, water-washed to remove water-solubles and distilled to recover the phenoxyphenol product.

References Cited in the file of this patent

UNITED STATES PATENTS 2,347,393    Bousquet et al. _____ Apr. 25, 1944

OTHER REFERENCES

Dean et al.: Jour. Chem. Soc. (Dec. 1954), pages 4638–41 (4 pages), 260–613.

Janssen et al.: Jour. Organic Chem., vol. 20 (Oct. 1955), pages 1328–39 (2 pages), 260–613. (Copies of above in Patent Office Library.)